United States Patent
Hinker et al.

(10) Patent No.: US 6,802,057 B1
(45) Date of Patent: Oct. 5, 2004

(54) AUTOMATIC GENERATION OF FORTRAN 90 INTERFACES TO FORTRAN 77 CODE

(75) Inventors: Paul J. Hinker, Longmont, CO (US); Michael Boucher, Lafayette, CO (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/563,503

(22) Filed: May 3, 2000

(51) Int. Cl.[7] ................................................. G06F 9/45
(52) U.S. Cl. ...................................... 717/137; 719/310
(58) Field of Search ................................ 719/328, 320, 719/310; 717/137, 138, 136

(56) References Cited

U.S. PATENT DOCUMENTS

| | | |
|---|---|---|
| 4,675,832 A | 6/1987 | Robinson et al. |
| 4,685,082 A | 8/1987 | Cheung et al. |
| 4,812,996 A | 3/1989 | Stubbs |
| 5,073,851 A | 12/1991 | Masterson et al. |
| 5,075,847 A | 12/1991 | Fromme |
| 5,079,707 A | 1/1992 | Bird et al. |
| 5,119,465 A | 6/1992 | Jack et al. |
| 5,146,593 A | 9/1992 | Brandle et al. |
| 5,168,563 A | 12/1992 | Shenoy et al. |
| 5,179,702 A | 1/1993 | Spix et al. |
| 5,274,813 A | 12/1993 | Itoh |
| 5,274,821 A * | 12/1993 | Rouquie ................... 717/139 |
| 5,297,274 A | 3/1994 | Jackson |
| 5,301,312 A | 4/1994 | Christopher, Jr. et al. |
| 5,325,499 A | 6/1994 | Kummer et al. |
| 5,325,533 A | 6/1994 | McInerney et al. |
| 5,353,401 A | 10/1994 | Iizawa et al. |
| 5,390,314 A | 2/1995 | Swanson |
| 5,438,659 A | 8/1995 | Notess et al. |
| 5,485,619 A | 1/1996 | Lai et al. |
| 5,499,349 A | 3/1996 | Nikhil et al. |
| 5,500,881 A | 3/1996 | Levin et al. |
| 5,519,866 A | 5/1996 | Lawrence et al. |
| 5,530,816 A | 6/1996 | Holt |
| 5,535,393 A | 7/1996 | Reeve et al. |
| 5,539,907 A | 7/1996 | Srivastava et al. |
| 5,553,235 A | 9/1996 | Chen et al. |
| 5,574,922 A | 11/1996 | James |
| 5,613,063 A | 3/1997 | Eustace et al. |
| 5,636,374 A | 6/1997 | Rodgers et al. |
| 5,640,550 A * | 6/1997 | Coker ......................... 707/4 |
| 5,673,387 A | 9/1997 | Chen et al. |
| 5,675,790 A | 10/1997 | Walls |
| 5,675,802 A | 10/1997 | Allen et al. |
| 5,689,712 A | 11/1997 | Heisch |
| 5,696,937 A | 12/1997 | White et al. |
| 5,710,727 A | 1/1998 | Mitchell et al. |

(List continued on next page.)

FOREIGN PATENT DOCUMENTS

| | | |
|---|---|---|
| DE | 199 34 515 A1 | 1/2000 |
| EP | 0 390 339 A2 | 3/1990 |
| EP | 0 703 534 A | 3/1996 |

(List continued on next page.)

OTHER PUBLICATIONS

W. Mitchell, "The Fortran 90 Bindings for OpenGL", NIST, CiteSeer.com, undated.*

(List continued on next page.)

*Primary Examiner*—S. Lao
(74) *Attorney, Agent, or Firm*—Finnegan, Henderson, Farabow, Garrett & Dunner, L.L.P.

(57) ABSTRACT

In accordance with methods and systems consistent with the present invention, a system that automatically generates Fortran 90 interfaces to Fortran 77 code is provided. These interfaces provide for the use of optional parameters and, because they are written in Fortran 90, also allow for parameter checking. These interfaces are automatically generated to allow a programmer to reap the benefits of Fortran 90 calling without having to rewrite the Fortran 77 underlying code.

8 Claims, 8 Drawing Sheets

U.S. PATENT DOCUMENTS

| | | | |
|---|---|---|---|
| 5,724,262 A | 3/1998 | Ghahramani | |
| 5,737,605 A | 4/1998 | Cunningham et al. | |
| 5,740,431 A | 4/1998 | Rail | |
| 5,742,793 A | 4/1998 | Sturges et al. | |
| 5,745,897 A | 4/1998 | Perkins et al. | |
| 5,748,892 A | 5/1998 | Richardson | |
| 5,748,961 A | 5/1998 | Hanna et al. | |
| 5,761,426 A | 6/1998 | Ishizaki et al. | |
| 5,774,724 A | 6/1998 | Heisch | |
| 5,784,698 A | 7/1998 | Brady et al. | |
| 5,787,285 A | 7/1998 | Lanning | |
| 5,787,480 A | 7/1998 | Scales et al. | |
| 5,805,795 A | 9/1998 | Whitten | |
| 5,812,799 A | 9/1998 | Zuravleff et al. | |
| 5,835,705 A | 11/1998 | Larsen et al. | |
| 5,850,554 A | 12/1998 | Carver | |
| 5,860,024 A | 1/1999 | Kyle et al. | |
| 5,864,867 A | 1/1999 | Krusche et al. | |
| 5,867,649 A | 2/1999 | Larson | |
| 5,867,735 A | 2/1999 | Zuravleff et al. | |
| 5,872,977 A | 2/1999 | Thompson | |
| 5,905,488 A | 5/1999 | Demers et al. | |
| 5,905,856 A | 5/1999 | Ottensooser | |
| 5,913,223 A | 6/1999 | Sheppard et al. | |
| 5,920,895 A | 7/1999 | Perazzoli, Jr. et al. | |
| 5,940,616 A | 8/1999 | Wang | |
| 5,963,975 A | 10/1999 | Boyle et al. | |
| 5,968,114 A | 10/1999 | Wentka et al. | |
| 5,970,510 A | 10/1999 | Sher et al. | |
| 5,974,536 A | 10/1999 | Richardson | |
| 5,978,892 A | 11/1999 | Noel et al. | |
| 5,991,708 A | 11/1999 | Levine et al. | |
| 5,991,893 A | 11/1999 | Snider | |
| 6,006,031 A | 12/1999 | Andrews et al. | |
| 6,009,514 A | 12/1999 | Henzinger et al. | |
| 6,014,517 A * | 1/2000 | Shagam et al. | 717/142 |
| 6,016,474 A | 1/2000 | Kim et al. | |
| 6,018,793 A | 1/2000 | Rao | |
| 6,023,583 A | 2/2000 | Honda | |
| 6,044,438 A | 3/2000 | Olnowich | |
| 6,049,798 A | 4/2000 | Bishop et al. | |
| 6,052,708 A | 4/2000 | Flynn et al. | |
| 6,052,763 A | 4/2000 | Maruyama | |
| 6,055,368 A | 4/2000 | Kunioka | |
| 6,065,019 A | 5/2000 | Ault et al. | |
| 6,066,181 A | 5/2000 | DeMaster | |
| 6,072,951 A | 6/2000 | Donovan et al. | |
| 6,077,312 A | 6/2000 | Bates et al. | |
| 6,081,868 A | 6/2000 | Brooks | |
| 6,085,029 A | 7/2000 | Kolawa et al. | |
| 6,088,771 A | 7/2000 | Steely, Jr. et al. | |
| 6,098,169 A | 8/2000 | Ranganathan | |
| 6,101,325 A | 8/2000 | Flaat | |
| 6,101,525 A | 8/2000 | Hecker | |
| 6,119,198 A | 9/2000 | Fromm | |
| 6,125,430 A | 9/2000 | Noel et al. | |
| 6,141,692 A | 10/2000 | Loewenstein et al. | |
| 6,145,054 A | 11/2000 | Mehrotra et al. | |
| 6,167,565 A * | 12/2000 | Kanamori | 717/146 |
| 6,173,327 B1 | 1/2001 | De Borst et al. | |
| 6,205,537 B1 | 3/2001 | Albonesi | |
| 6,223,134 B1 | 4/2001 | Rust et al. | |
| 6,253,252 B1 | 6/2001 | Schofield | |
| 6,263,485 B1 | 7/2001 | Schofield | |
| 6,269,457 B1 | 7/2001 | Lane | |
| 6,282,702 B1 | 8/2001 | Ungar | |
| 6,286,130 B1 | 9/2001 | Poulsen et al. | |
| 6,295,600 B1 | 9/2001 | Parady | |
| 6,304,951 B1 | 10/2001 | Mealey et al. | |
| 6,311,320 B1 | 10/2001 | Jibbe | |
| 6,314,429 B1 | 11/2001 | Simser | |
| 6,317,871 B1 | 11/2001 | Andrews et al. | |
| 6,351,845 B1 | 2/2002 | Hinker et al. | |
| 6,353,829 B1 | 3/2002 | Koblenz et al. | |
| 6,353,869 B1 | 3/2002 | Ofer et al. | |
| 6,369,725 B1 | 4/2002 | Busaba | |
| 6,430,657 B1 | 8/2002 | Mittal et al. | |
| 6,434,714 B1 | 8/2002 | Lewis et al. | |
| 6,438,745 B1 * | 8/2002 | Kanamaru et al. | 717/137 |
| 6,442,162 B1 | 8/2002 | O'Neill et al. | |
| 6,480,818 B1 | 11/2002 | Alverson et al. | |
| 6,496,902 B1 | 12/2002 | Faanes et al. | |
| 6,502,136 B1 | 12/2002 | Higuchi et al. | |
| 6,523,090 B2 | 2/2003 | Tremblay | |
| 6,542,919 B1 | 4/2003 | Wendorf et al. | |
| 6,629,214 B1 | 9/2003 | Arimilli et al. | |
| 6,647,546 B1 * | 11/2003 | Hinker et al. | 717/137 |
| 2001/0051974 A1 | 12/2001 | Saad | |
| 2002/0046201 A1 | 4/2002 | Hembry | |
| 2002/0073360 A1 | 6/2002 | Lewis et al. | |
| 2002/0078010 A1 | 6/2002 | Ehrman et al. | |
| 2003/0061395 A1 | 3/2003 | Kingsbury et al. | |

FOREIGN PATENT DOCUMENTS

| | | |
|---|---|---|
| EP | 0 817 044 A2 | 1/1998 |
| EP | 0 965 921 A2 | 12/1999 |
| EP | 1 026 592 A2 | 2/2000 |
| EP | 1 024 432 A | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 7/2001 |
| JP | 03-282731 A | 12/1991 |
| JP | 07-056716 A | 3/1995 |
| WO | WO 99/10812 A | 3/1999 |

OTHER PUBLICATIONS

J. Purtilo, et al, "Module Reuse by Interface Adaption", Software—Practice and Experience, 1991, pp. 539–556.*

A. Buckley, "Converison to Fortran 90: A Cace Study", ACM, 1994, pp. 308–353.*

M. Metcalf, "convert.f90", CERN, Geneva, 1991, 1997, pp. (27), ftp://ftp.numerical.rl.ac.uk/pub/MandR/convert.f90.*

"Visual Basic 5.0 Introduction", Windows 95 Student Manual, XX, XX, 1997, XP002926932.

Cantril B.M. et al., "ThreadMon: A Tool for Monitoring Multithreaded Program Performance," System Sciences, 1997, Proceedings of the Thirtieth Hawaii Int'l Conference of Wailea, HI, USA Jan. 7–10, 1997, pp. 253–265.

Grundy, J.C., et al., "Supporting Flexible Consistency Management Via Discrete Change Description Propagation", Software Practice & Experience, John Willey & Sons Ltd. Chichester, GB, vol. 26, No. 9 XP000655597.

Karavanic K. L. et al., "Integrated Visualization of Parallel Program Performance Data," vol. 23, No. 1, Apr. 1, 1997 pp. 181–198.

Netscape Communicator, "Netscape Page Infor for 'Dynamic Instrumentation of Threaded Applications,'" Internet Article, Online, <URL:ftp://ftp.cs.wisc.edu/paradyn/technical_papers/threads.pdf>, Mar. 10, 1904 [sic: 2004].

Xu, Miller & Naim, "Dynamic Instrumentation of Threaded Applications," Internet Article, Online, <URL:ftp://ftp.cs.wisc.edu/paradyn/technical_papers/threads.pdf> Nov. 2, 1998, pp. 1–16.

Nathan P. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pp. 230–239, IEEE (1998).

Valvano, "Debugging Strategies," Chapter 6, pp. 6–1–6.10, Real Time Debugging, Online Manual, Jun. 7, 1999, Retrieved from the Internet: <URL:http://www.ece.utexas.edu/{valvano/EE360P/PDF/Ch6.pdf>.

"Code Complete: A Practical handbook of Software Construction," Steve McConnell, Chapter 19–Self–Documenting Code, http://library.books24x7.com/book/id 2835/viewer.asp?pr=1, 1993, Microsoft Press.

Handy, Jim, "The Cache Memory Book", Second Edition, Choosing Cache Policies, Copyright 1998, pp. 55, 66, 67, 155.

IBM Technical Disclosure Bulletin, "Caching Objects in a Data Space," Oct. 1, 1994, vol. No. 37, pp. 587–590.

Microsoft Press, "Microsoft Press Computer Dictionary: Third Edition", 1997, p. 101.

Metcalf, Michael, "CERN," Geneva 1991, 1997 pp. 1–27, ftp://ftp<numerical.rl.ac.uk/pub/MandR/convert.f90.

"dcpid—DIGITAL Continuous Profiling Infrastructure daemon", Man pages for SCR–Installed Programs (Alpha/NT), Online <URL:http://research.compaq.com/SRC/dcpi/html/natalpha/dcpi.html>, 1997, pp. 1–6.

Browne et al., "PAPI: Portable Interface to Hardware Performance Counters," Cewes Major Shared Resources Center Pet Technical Reports, vol. 99–06, 1999, Online, <URL:http://www.wes.hpc.mil/pet/tech_reports/reports/pdf/tr_9906.pdf>, pp. 3–13.

IBM Technical Disclosure Bulletin, "Internal Performance MEasurement Counters," IBM Corp., vol. 34, No. 4A, Sep. 1991, pp. 51–52 (the whole document).

IBM Technical Disclosure Bulletin, "Simultaneous Viewing of Performance Monitor Data Independent of COunters," IBM Corp., vol. 39, No. 10, Oct. 1996, pp. 181–183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1–22.

"Algorithm Visualization System: Introduction," available online at: www.cp/eng.chula.ac.th/faculty/spi/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587–590.

"GeoMAMOS Project Home Page," available online at: www.ece.nwu.edu/–theory/geomamos.html as of Jun. 10, 1999, 4 pages.

"Introduction," available online at: www.ece.nwu.edu/–theory/gs_tech_1_html/section 3_1.html as of Jun. 10, 1999, pages.

"Pentium Processor Family User Manual vol. 3: Architecture and Programming Manual," pp. 25–182, 25–183, 25–309, and 25–310, Intel Corp., (1994).

"Purify for Windows NT, Product Overview," Ver. 6.0, available online at: www.rational.com/products/purify_nt/prodinfo/index.jtmpl as of Jan. 11, 1999, 3 pages.

"Scientific Simulations and Algorithm Visualizations Using NESL and Java," available online at: www.cs.cmu.edu/–scandal/applets/ as of Jun. 10, 1999, 1 page.

"Visualization for Developing Geometric Algorithms," available online at: www.ece.nwu.edu/–theory/gs_tech_1_html/section3_3.html as of Jun. 10, 1999, 2 pages.

Attali et al., "Semantic–Based Visualization for Parallel Object–Oriented Programming," Proceedings of the 11th Annual Conference on Object Oriented Programing Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture", Morgan Kaufman Publishers, Inc., San Francisco, California, 1999.

Ian Foster, "Designing and Building Parallel Programs", Addison–Wesley Publishing Company, 1995.

Kevin Dowd and Charles R. Severance, "High Performance Computing," Second Edition, Chap. 10, Shared Memory Multiprocessors, Aug. 1998, pp. 216–18.

Sun Microsystems Computer Company, "Prism 5.0 Reference Manual," Revision A., Nov. 1997.

Sun Microsystems, "UltraSPARC User's Manual," UltraSPARC–1, UltraSPARC–II, Jul. 1997, pp. 319–25.

Wasserman et al., "A Graphical Extensible Integrated Environment for Software Development," Proceedings of the ACD SIGSOFT/SIGPLAN Software Engineering Symposium on Practical Software Development Environments, 1986, pp. 131–142.

Broberg et al., "Visualization and Peformance Prediction of Multithreaded Solaris Programs by Tracing Kernel Threads", Department of Software Engineering and Computer Science, University of Karskrona/Ronneby, Sweden, 7 pages.

Haggander et al., "Optimizing Dynamic Memory Management in a Multithreaded Application Executing on a Multiprocessor," 1998 International Conference on Parallel Processing, 1998, Minneopolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

* cited by examiner

AUTOMATIC GENERATION OF FORTRAN 90 INTERFACES TO FORTRAN 77 CODE

FIELD OF THE INVENTION

The present invention relates generally to data processing systems and, more particularly, to the automatic generation of Fortran 90 interfaces to Fortran 77 code.

BACKGROUND OF THE INVENTION

Before 1990, programmers wrote enormous amounts of code in the Fortran 77 (F77) programming language, which is a fixed parameter language, meaning that each call to a particular subprogram (e.g., a subroutine or a function) contains the same list of parameters. For example, the subprogram SASUM (N, A, Inca) requires three parameters, each of which must be specified every time the subprogram is called. In this example, "N" indicates the length of A, "A" is an array pointer, and "Inca" indicates the stride of A, which is the relative offset within the array for each element to be operated upon. The SASUM subprogram sums the elements of array A at the Inca stride. Thus, for example, if the stride were 2, every second element (e.g., elements A[1], A[3], A[5], etc.) would be summed.

In 1990, the Fortran 90 (F90) language was developed as an improvement over the F77 language by providing a number of additional features, including optional parameters and parameter checking. The use of optional parameters allows a programmer to use different parameter lists to invoke the same subprogram. For example, the following three subprogram calls invoke the same subprogram, even though the number of parameters differs:

Total=SASUM (grades)

Total=SASUM (N, grades)

Total=SASUM (N, grades, Inca)

F90's parameter checking feature determines whether the types of the parameters are appropriate, whether the number of parameters in the parameter list is appropriate, and whether the shape of the parameters is appropriate. The "shape" of a parameter refers to the dimensionality of the parameter. For example, a two-dimensional array has a shape of 2D.

Although F90 provides a number of beneficial features, because there is so much existing code written in F77, it is cost prohibitive to rewrite all of the F77 code. Therefore, it is desirable to facilitate the use of F77 code from F90 code.

SUMMARY OF THE INVENTION

In accordance with methods and systems consistent with the present invention, a system that automatically generates F90 interfaces to F77 code is provided. These interfaces provide for the use of optional parameters and, because they are written in F90, also allow for parameter checking. These interfaces are automatically generated to allow a programmer to reap the benefits of F90 calling without having to rewrite the F77 underlying code.

In accordance with an implementation of methods consistent with the present invention, a method is provided in a data processing system that receives F77 source code and that automatically generates a F90 interface to the F77 source code.

In accordance with another implementation, a method is provided in a data processing system having source code with a subprogram having specified parameters. The method reads the source code, where the source code is written in a language where the specified parameters are required parameters such that a value for each specified parameter is required to be provided when the subprogram is invoked. Further, the method generates a stub routine that invokes the subprogram and that facilitates use of a missing value for at least one of the specified parameters.

In yet another implementation, a method is provided in a data processing system with a subprogram written in a fixed parameter language such that the subprogram has a required set of parameters requiring values when the subprogram is invoked. The method invokes a first stub routine with a first plurality of parameter values, the first stub routine using the first parameter values to generate the values for the required set of parameters and invoking the subprogram with the values for the required set of parameters. Further, the method invokes a second stub routine with a second plurality of parameter values, the second stub routine using the second parameter values to generate the values for the required set of parameters and invoking the subprogram with the values for the required set of parameters. The second parameter values have a different number than the first parameter values.

In accordance with an implementation of systems consistent with the present invention, a computer-readable memory device encoded with a program having instructions for execution by a processor is provided. The program comprises fixed parameter code with a subprogram having a plurality of required parameters requiring values at invocation. The program also comprises a stub routine that receives a set of parameter values and creates the values for the required parameters from the received set of parameter values to invoke the subprogram, where the received set of parameter values lacks at least one of the values for the required parameters.

In another implementation of systems consistent with the present invention, a data processing system is provided. This data processing system contains a storage device and a processor. The storage device comprises fixed parameter source code with a subprogram having a plurality of required parameters that require values when the subprogram is invoked and an interface generator that reads the subprogram and that generates an interface file with indications of characteristics of the required parameters. The storage device also comprises a stub generator that reads the interface file and that generates a plurality of stubs for the subprogram. Each of the stubs receives a set of parameter values, generates the parameters from the received set of parameter values, and invokes the subprogram with the values for the required parameters. The received set of parameter values for at least one of the stub routines lacks the value for at least one of the required parameters. The processor runs the interface generator and the stub generator.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

In accordance with methods and systems consistent with the present invention, an automatic method of generating F90 interfaces to F77 code is provided. This method allows callers to invoke one of the F90 interfaces to call the underlying F77 code, thus enabling them to take advantage of the benefits of F90 without having to rewrite the F77 code. As a result, the caller gains the benefit of parameter checking and the use of optional parameters.

Overview

Methods and systems consistent with the present inversion provide a script that scans the F77 source code and that generates an interface file for each subprogram. This file defines the signature for the associated subprogram, including its name, its parameters, and each parameter's type. This script then scans the F77 source code again and inserts code-generator statements into each interface file. These code-generator statements provide meaningful information, such as characteristics of the parameters, to facilitate the automatic generation of F90 interfaces. After the code-generator statements are added, another script is run that reads each interface file and automatically generates a number of stubs, each of which is a routine that serves as an F90 interface to the F77 subprogram. A stub is generated for each legal parameter combination for each subprogram. A legal parameter combination is a combination of parameters in which the specified parameters can uniquely identify the appropriate stub routine and values for any missing parameters can be generated. Thus, for a given F77 subprogram, a number of stubs will be generated including one with a full parameter list and one for each legal parameter combination, in which fewer than all of the parameters are specified. In this manner, the caller has the flexibility of invoking any of the stubs to invoke the F77 subprogram and may thus use fewer than all the parameters normally required by the F77 subprogram.

Figure 1:
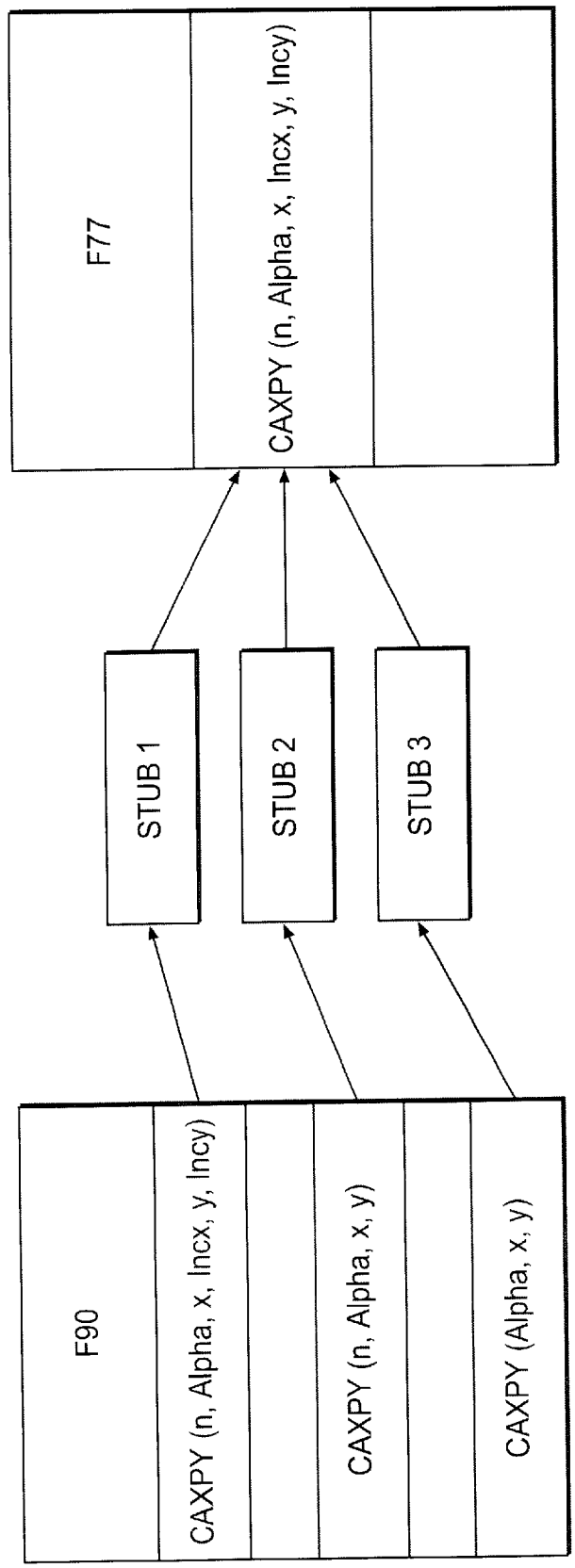
FIG. 1 depicts a number of subprogram calls utilizing stubs to invoke the same underlying subprogram in accordance with methods and systems consistent with the present invention.

When the caller makes a subprogram call, the corresponding stub is invoked, which generates values for any missing parameters, because F77 cannot handle optional parameters. Then, the stub invokes the appropriate F77 subprogram. Regardless of which stub of the F77 subprogram is invoked, the F77 subprogram is ultimately invoked. Thus, the caller may.take advantage of the benefits of F90 calling, but the F77 code need not be rewritten. For example, in FIG. 1, three F90 subprogram calls contain different parameter lists. Each call invokes a particular stub that will insert the missing parameters, if any, and then call the F77 subprogram. In this manner, the programmer of the F90 code can take advantage of the optional parameter passing and type checking provided by F90 without having to rewrite the F77 code.

Implementation Details

Figure 2:
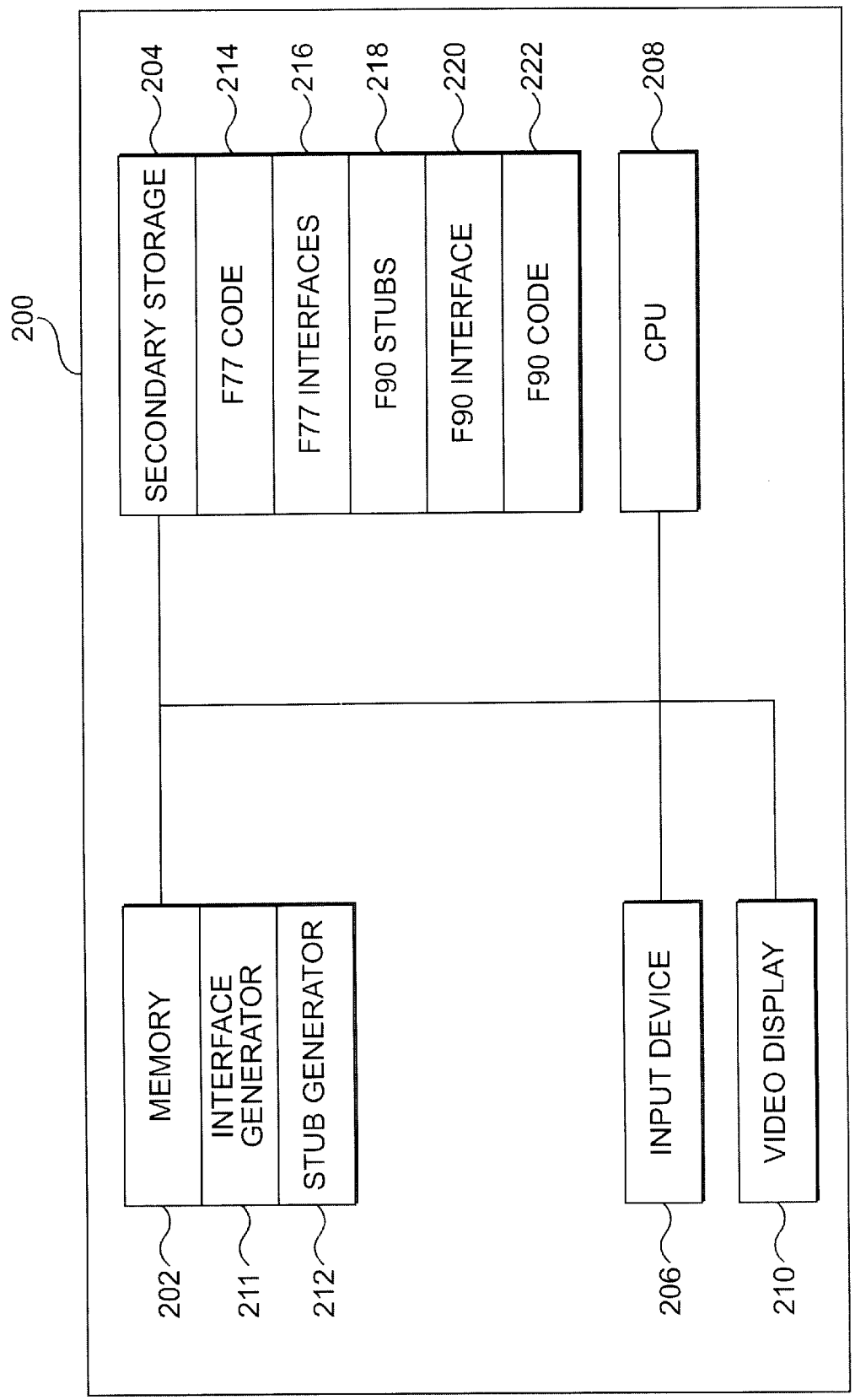
FIG. 2 depicts a data processing system suitable for use with methods and systems consistent with the present invention.

FIG. 2 depicts a data processing system 200 suitable for use with methods and systems consistent with the present. Data processing system 200 includes a memory 202, a secondary storage device 204, an input device 206, a central processing unit (CPU) 208, and a video display 210. In the memory 202 resides an interface generator 211 and a stub generator 212. Interface generator 211 reads F77 source code 214 and generates F77 interface files 216, one for each subprogram encountered in the source code. Stub generator 212 reads F77 interface files 216 and generates both F90 stubs 218 and F90 interface 220 so that F90 code 222 can utilize the F90 stubs to invoke the F77 code. F90 interface 220 provides declarations for F90 stubs 218 to enable the compilation of F90 code 222.

The following is a definition of the F77 interface file, where the words INTERFACE, SUBROUTINE, FUNCTION, and END are keywords and the word TYPE represents any valid Fortran type (i.e., INTEGER, LOGICAL, REAL, CHARACTER, or COMPLEX):

TABLE 1

INTERFACE Interface_Name
    {SUBROUTINE | TYPE FUNCTION} (Parameter1, [Parameter2, . . . , ParameterN])
    TYPE Parameter1
    TYPE Parameter2
    . . .
    TYPE ParameterN
    END SUBROUTINE
END INTERFACE The following is an example of an F77 Interface for the CAXPY Fortran 77 subprogram, which performs the addition of two vectors X and Y and adds a constant Alpha:

TABLE 2

INTERFACE CAXPY
    SUBROUTINE CAXPY (N, ALPHA, X, INCX, Y, INCY)
    INTEGER : : N
    COMPLEX : : ALPHA
    COMPLEX : : X (*)
    INTEGER : : WCX
    COMPLEX : : Y (*)
    INTEGER : : INCY
    END SUBROUTINE
END INTERFACE

An example of an F90 stub routine for the CAXPY subprogram follows:

TABLE 3

SUBROUTINE CAXPY_2 (N, ALPRA, X, Y)
IMPLICIT NONE
INTEGER : : N
COMPLEX : : ALPHA
COMPLEX, DIMENSION (:) : : X
INTEGER : : INCX
COMPLEX, DIMENSION (:) : : Y
INTEGER : : INCY
INCX = (LOC(X(2)) − LOC(X(1))) / 8
INCY = (LOC(Y(2)) − LOC(Y(1))) / 8
CALL CAXPY (N, ALPHA, %val (loc (X)), INCX, %VAL (loc (Y), INCY)
RETURN
END In the stub CAXPY_2, the two integer stride parameters (INCX and INC Y) are not provided to the subprogram as part of the subprogram call, so the stub routine assigns values for them before providing the fully specified parameter list to the F77 subprogram CAXPY. For example, the value of INCX is calculated by analyzing the difference in the address between successive elements in the X array, and the stub performs a similar calculation to assign the value of INCY.

Figure 3:
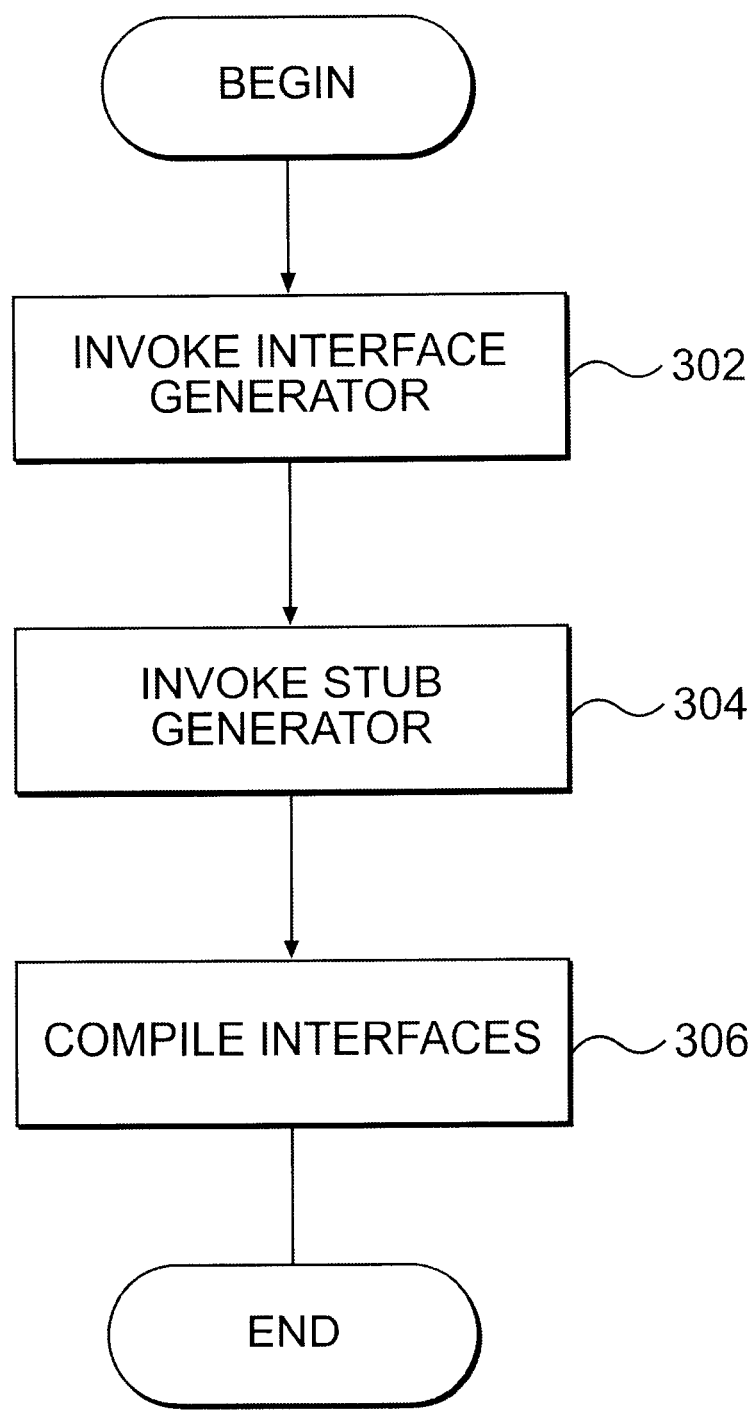
FIG. 3 depicts a flow chart of the steps performed to automatically generate F90 interfaces in accordance with methods and systems consistent with the present invention.

FIG. 3 depicts a flowchart of the steps performed by methods and systems consistent with the present invention when creating the stubs. The first step performed is to generate the F77 interface file from the F77 code by invoking the interface generator (step 302). In this step, the interface generator scans the F77 source code and creates an interface file for each subprogram contained in it according to the definition provided above. The interface generator then adds code-generator statements to the interface file to facilitate the stub generator in creating stubs for each subprogram. It parses the arguments of each subprogram and adds a comment line that provides meaningful information so that the stub generator can generate a stub. For example, such meaningful information may include how to generate a value for a given parameter if the value for the parameter is missing. After invoking the interface generator, the user invokes the stub generator (step 304). The stub generator reads the interface files and generates stub routines by using the code-generator statements. The stub generator also produces interfaces for the stub routines. These interfaces are used to resolve references during compilation of the F90 program. Once generated, the stubs are compiled and can be linked into the F90 source code to enable their invocation from the F90 source code (step 306).

Figure 4A:
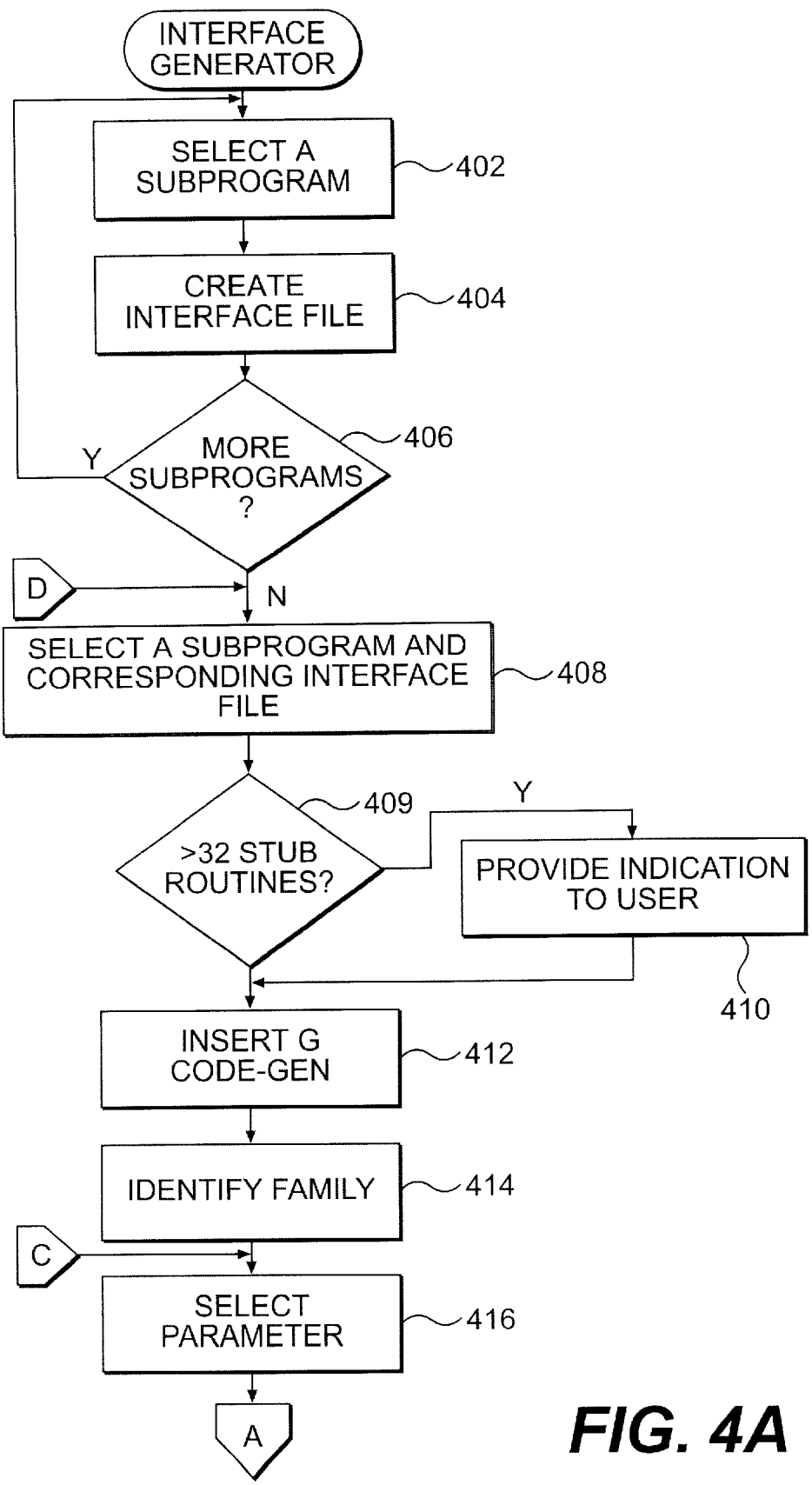
FIGS. 4A, 4B, and 4C depict a flow chart of the steps performed by the interface generator depicted in FIG. 2.
Figure 4B:
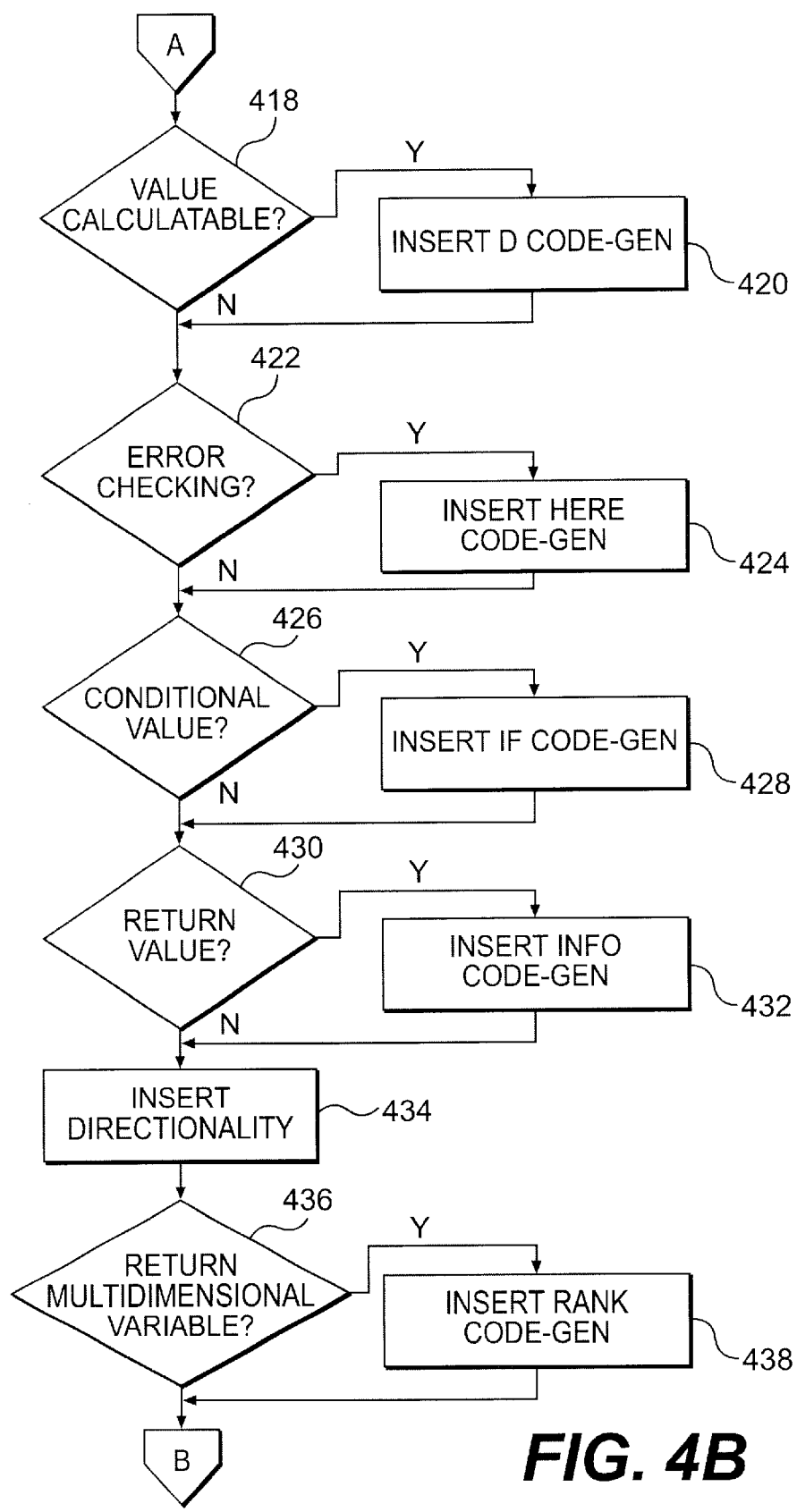
Figure 4C:
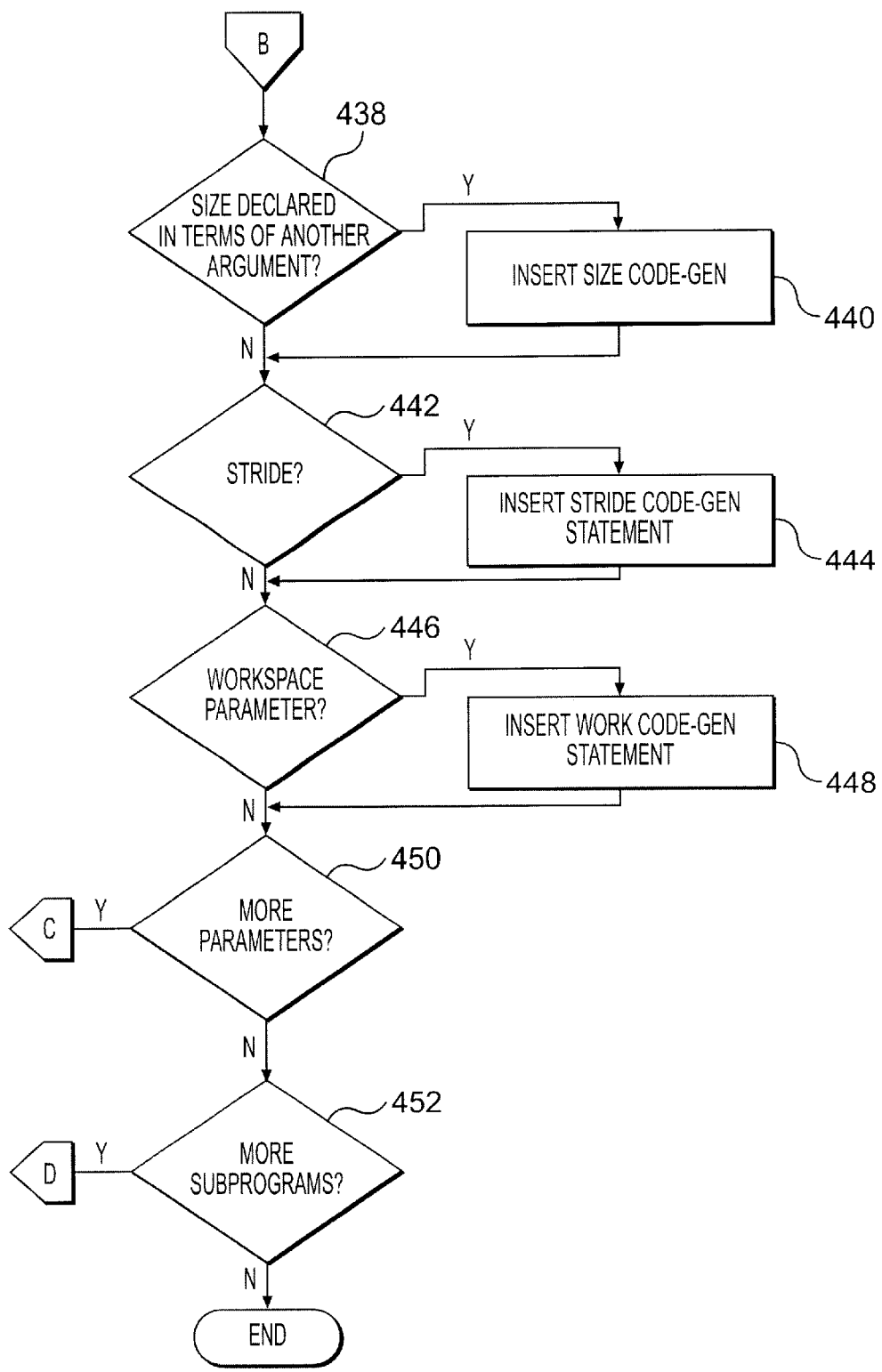

FIGS. 4A, 4B, and 4C depict a flowchart of the steps performed by the interface generator. The first step performed by the interface generator is to select a subprogram from the F77 code (step 402). Next, the interface generator creates an interface file for this subprogram (step 404). In this step, the interface generator generates a definition for the subprogram similar to that described above with respect to Table 1. After creating the file, the interface generator determines whether there are more subprograms in the F77 code (step 406). If so, processing continues to step 402.

Otherwise, the interface generator performs a second pass through the F77 code by selecting a subprogram and its corresponding interface file (step 408). Next, the interface generator determines if more than 32 stubs could be generated by determining the various legal combinations of parameters (step 409). A "legal" combination is one in which the specified parameters. can uniquely identify a stub routine and the values of the missing parameters can be calculated. If more than 32 stubs could be generated, the interface generator provides an indication to the user (step 410), so that after the interface generator completes its processing, the user has the option of editing the stubs to remove a number of them that will most likely not be used. After providing the indication to the user or if there are 32 or less stub routines to be generated, the interface generator inserts "G" code-generator statements into the interface file indicating the stub routines that should be generated, one for each legal combination of parameters (step 412). The "G" code-generator statement takes the form of G(list), where "list" specifies a valid parameter list. An example of the "G" code-generator statements inserted into an interface file follows:

TABLE 4

```
!#G (N, X, INCX, Y, INCY)
!#G(X,Y)
    INTERFACE AG
        SUBROUTINE RAG (N, X, INCX, Y, INCY)
        INTEGER : : N      !#D(100)
        REAL           : : X(:)
        INTEGER : : INCX      !#D (1)
        REAL           : : Y(:)
        INTEGER : : INCY      !#D (1)
        END SUBROUTINE
END INTERFACE
```

Next, the interface generator identifies the family in which this subprogram operates (step 414). An implementation of methods and systems consistent with the present invention operates on a library of subprograms that perform scientific calculations. This library groups the subprograms into families, and in this step, the interface generator identifies the generic family that the subprogram is associated with by determining the root of the subprogram name. In accordance with methods and systems consistent with the present invention, the first two characters of the subprogram name indicate both the input and output types with the generic family name following. If the family name cannot be identified in this manner, then the programmer has specified the family name in the comments of the source code and the interface generator identifies the family name from this information. After identifying the generic family name, the interface generator inserts a GENERIC code-generator statement next to the subprogram name indicating the generic family name. The GENERIC code-generator statement takes the form of GENERIC(name), where the "name" refers to the family name. An example of the GENERIC code-generator statement follows:

TABLE 5

```
INTERFACE ICAMAX !#GENERIC (IAMAX)
    SUBROUTINE ICAMAX (N, X, INCX)
    INTEGER : : N !#D (100)
    COMPLEX : : X(:)
    INTEGER : : INCX
END INTERFACE
```

After identifying the family, the interface generator selects a parameter within the subprogram (step 416). The arguments for the subprograms in the F77 code contain comments that provide a significant amount of information about that parameter, such as whether the parameter is an input, output, or input/output parameter; its type; and the meaning associated with its values. In accordance with methods and systems consistent with the present invention, the parameter descriptions closely conform to the following form:

TABLE 6

| Parameter Name | Comment Line in Source Code |
|---|---|
| N | (input) INTEGER |
|   | The order of the matrix A. N >= 0. |
| D | (input/output) COMPLEX array, dimension (N) |
|   | On entry, the diagonal elements of A. |
|   | On exit, the diagonal elements DD. |
| L | (input/output) COMPLEX array, dimension (N−1) |
|   | On entry, the subdiagonal elements of A. |
|   | On exit, the subdiagonal elements of LL and DD. |
| SUBL | (output) COMPLEX array, dimension (N−2) |
|   | On exit, the second subdiagonal elements of LL. |
| NRHS | (input) INTEGER |
|   | The number of right hand sides, i.e., the number of columns of matrix B. NRHS >= 0. |
| B | (input/output) COMPLEX array, dimension (LDB, NRHS) |
|   | On entry, the N-by-NRHS right hand side matrix B. |
|   | On exit, ifINFO = 0, the N-by-NRHS solution matrix X. |
| LDB | (input) INTEGER |
|   | The leading dimension of the array B. LDB >= max (1, N). |
| IPIV | (input) INTEGER array, dimension (N) |
|   | Details of the interchanges and Nock pivot. If IPIV (K) > 0, 1 by 1 pivot, and if IPIV (K) = K + 1 an interchange done; |

TABLE 6-continued

| Parameter Name | Comment Line in Source Code |
|---|---|
| INPO | If IPIV (K) < 0, 2 by 2 pivot, no interchange required. (output) INTEGER =0: successful exit <0: if INFO = −k, the k-th argument had an illegal value >0: if INFO =k, D (k) is exactly zero. The factorization has been completed, but the block diagonal matrix DD (that is D (K)) is exactly singular, and division by zero will occur if it is used to solve a system of equations. |

Thus, when an argument "N" appears in a subprogram, its associated comment indicates that it is an input parameter, it is of type integer, and its purpose is to define the order of the matrix A. After selecting a parameter, the interface generator determines whether the value of this parameter can be calculated from either the other parameters or another source (step 418). For example, if the selected parameter were a length parameter or a stride parameter, the value of the parameter can be obtained through a system call to Fortran 90 to identify the size or stride of the parameter. If the value of the parameter is calculatable, the interface generator inserts a code-generator statement "D" as a comment next to the parameter declaration (step 420). The "D" code-generator statement indicates that the parameter is optional because its value can be derived from another source. The "D" code-generator statement takes the form of D(expression), where "expression" indicates how to derive the value of the parameter. A valid "expression" could include any constant term, any expression which may include constant terms and/or actual parameters, or other code-generator statements. An example of the "D" code-generator statement follows:

TABLE 7

```
INTERFACE AD
    SUBROUTINE CAD (N, X)
    INTEGER : : N !#D (100)
    COMPLEX : : X(:)
    END SUBROUTINE
END INTERFACE
INTERFACE AD
    SUBROUTINE CAD (N, X, M)
    INTEGER : : N !#D (#SIZE (X))
    COMPLEX : : X (*)
    INTEGER : : M !#D (N)
    END SUBROUTINE.
END INTERFACE
```

The interface generator then determines if error checking was requested for this argument (step 422 in FIG. 4B). This determination is made by examining. the comments associated with the parameter. If error checking was requested by the programmer, an indication would be provided in the comments, and in this case, the interface generator inserts the HERE code-generator statement (step 424). The HERE code-generator statement checks to ensure that the value for the associated parameter is supplied when a given expression evaluates to true. If the value is not provided, an error will be printed and execution will stop. The HERE code-generator statement takes the form of HERE(expression), where "expression" evaluates to true or false. An example follows:

TABLE 8

```
INTERFACE CHERE
    SUBROUTINE CHERE (FLAG, N, X, XOPT)
    CHARACTER : : FLAG !#D('Y')
    INTEGER: : : N !#D (#SIZE (X))
    COMPLEX : : X(*)
    COMPLEX : : XOPT(*) !#HERE(FLAG .EQ. 'Y')
    END SUBROUTINE
END INTERFACE
```

Next, the interface generator determines if the argument has a conditional value (step 426). If so, the interface generator inserts the IF code-generator statement (step 428). In this step, the programmer has indicated in the source code the conditional requirement, and thus, the interface generator inserts an appropriate expression indicating the conditionality of the argument. The "IF" code-generator statement is defined as IF(expression, default1 {ELSE default2}), where if "expression" evaluates to true, then the value of this argument is default1. Otherwise, the value is default2.

TABLE 9

```
INTERFACE IF
    SUBROUTINE CIF (FLAG1, N, ARRAY)
    CHARACTER : : FLAG1 !#D('Y')
    INTEGER : : N !#IF ((FLAG1 .EQ. 'Y'), #D (100),
    #ELSE (#D (200))
    INTEGER : : ARRAY(:)
    END SUBROUTINE
END INTERFACE
```

After inserting the IF code-generator statement or if the argument does not have a conditional value, the interface generator determines if this argument has a return value (step 430). If so, the interface generator inserts the INFO code-generator statement (step 432). This determination is made by identifying whether the word "status" appears in the comments. If such a comment appears, then the INFO code-generator statement is added which checks the value against an expected value per the comment, and if it is not correct, it generates an error. The INFO code-generator statement is defined as INFO {(ok_expression)}, where "ok_expression" resolves to the expected value. The INFO argument is an argument that returns the status of the call. If the caller supplies this argument, then the stub passes it into the F77 subprogram and does no further processing. If the caller does not supply it, then the stub creates a variable of the correct type and passes it to the F77 subprogram. If ok_expression is not supplied, the stub assumes that INFO.EQ.0 indicates a proper return. If ok_expression is supplied as a scalar, the stub assumes that INFO.EQ.ok_expression indicates a proper return. If ok_expression is supplied as an expression, the stub evaluates that expression exactly as it appears. A result of TRUE indicates a proper return, and any other result indicates an improper return or error condition in the called subprogram. An example of the INFO code-generator statement follows:

TABLE 10

```
INTERFACE INFO
    SUBROUTINE SNFO (N, INFO)
    INTEGER : : N !#D(100)
    INTEGER: : INFO !#INFO
    END SUBROUTINE
END INTERFACE
```

Next, the interface generator inserts the directionality of the parameter into the interface file (step 434). In this step, the interface generator determines if the parameter is an in/out, input, or output parameter by examining the comments in the source code. After making this determination, either an input/output, input, or output code-generator statement is inserted into the interface file.

If the parameter is. an input/output parameter, it is passed with input and output semantics, as required by the language. In the case of C interfaces, this means that the C interface passes a scalar parameter by reference. This parameter allows the compiler to perform optimizations across subprogram boundaries. An example of the INOUT code-generator statement follows:

TABLE 11

INTERFACE INOUT
    SUBROUTINE SINOUT (N, A, RECOND)
    INTEGER : : N !#D (#SIZE (A))
    INTEGER : : A(*)
    REAL : : RCOND !#INOUT
    END SUBROUTINE
END INTERFACE

If the parameter is an INPUT parameter, it is passed with input semantics. In the case of C interfaces, this means that the C interface can pass the parameter by value. This parameter allows the compiler to perform optimizations across subprogram boundaries.

TABLE 12

INTERFACE INPUT
    SUBROUTINE SINPUT (N, A, RECOND)
    INTEGER : : N !#D (#SIZE (A))
    INTEGER : : A(*)
    REAL : : RCOND !#INPUT
    END SUBROUTINE
END INTERFACE

If the parameter is an OUTPUT parameter, it is passed with output semantics. In the case of C interfaces, this means that the C interface needs to pass a scalar parameter by reference. This parameter allows the compiler to perform optimizations across subprogram boundaries.

TABLE 13

INTERFACE OUTPUT
    SUBROUTINE SOUTPUT (N, A, RECOND)
    INTEGER : : N !#D (#SIZE (A))
    INTEGER : : A(*)
    REAL : : RCOND !#OUTPUT
    END SUBROUTINE
END INTERFACE

After inserting the directionality, the interface generator determines if the argument will return a multi-dimensional variable (step 436). If so, it inserts a RANK code-generator statement indicating that this stub should generate both a multi-dimensional array as well as a single dimensional variable in the event that the programmer was only expecting a one-dimensional variable (step 438). The RANK code-generator statement is defined as RANK(list), where list indicates the possible dimensions of the parameter. An example follows:

TABLE 14

INTERFACE RANK
    SUBROUTINE CRANK (N, ARRAY)
    INTEGER : : N
    COMPLEX : : ARRAY(:,:) !#RANK(1)
    END SUBROUTINE
END INTERFACE

Next, the interface generator determines if the size of the argument is declared in terms of another argument (step 438 in FIG. 4C), and if so, it adds the SIZE code-generator statement (step 440). The SIZE code-generator statement is defined as SIZE(name, [#DIM=d]), where "name" is the name of the variable that this parameter acts as the size of and "DIM" indicates the dimensionality of the variable. Following is an example of the SIZE code-generator statement:

TABLE 15

INTERFACE SIZE
    SUBROUTINE DSIZE (N, ARRAY)
    INTEGER : : N !#D (#SIZE (ARRAY))
    DOUBLE PRECISION : : ARRAY (:)
    END SUBROUTINE
END INTERFACE

The interface generator then determines if this parameter is a stride parameter indicating the stride of another parameter by examining the comments associated with the parameter (step 442). If the comments indicate that this parameter is a stride for another parameter, the interface generator inserts the stride code-generator statement (step 444). The STRIDE code-generator statement is defined as STRIDE (name,[#DIM=d]), where "name" indicates the parameter that this parameter is the stride for and "DIM" indicates the dimensionality of the parameter.

TABLE 16

INTERFACE INPUT
    SUBROUTINE CSTRIDE (N, X, INCX, Y, INCY)
    INTEGER : : N !#D (#SIZE (X))
    COMPLEX : : X
    INTEGER : : INCX !#D (#STRIDE (X))
    COMPLEX : : Y
    INTEGER : : INCY !#D (#STRIDE (Y))
    END SUBROUTINE
END INTERFACE

Next the interface generator determines if this parameter is a work space parameter (step 446). A workspace parameter provides memory that will be used by the underlying F77 subprogram. This determination is made by examining the comments of the parameter in the source code. If this parameter is a workspace parameter, the interface generator inserts the WORK code-generator statement into the interface file (step 448). The WORK code-generator statement is defined as WORK(expression), where the "expression" indicates the size of the workspace.

TABLE 17

INTERFACE WORK
    SUBROUTINE CWORK (N, ARRAY, WORK, IWORK)
    INTEGER : : N !#D (#SIZE (ARRAY, #DIM=1))
    COMPLEX : : ARRAY
    REAL : : WORK (:) !#if( (N.GT.0), #WORK (N), #ELSE
        (#WORK (N*2)))

TABLE 17-continued

```
        REAL    : : IWORK(:) !#WORK (N)
        END SUBROUTINE
    END INTERFACE
```

Next, the interface generator determines if more parameters remain to be processed (step 450), and if so, processing continues to step 412. Otherwise, the interface generator determines if more subprograms remain for processing (step 452), and if so, processing continues to step 408. If no more subprograms remain to be processed, processing ends.

For an example of inserting code-generator statements into an interface file, consider the following. The CSTSV subprogram computes the solution to a complex system of linear equations A*X=B, where A is an N-by-N symmetric tridiagonal matrix and X and B are N-by-NRHS matrices. The following interface file is generated by examining the CSTSV F77 source to extract the parameter list and the parameter declarations.

```
INTERFACE
    SUBROUTINE CSTSV (N, NRHS, L, D, SUBL, B, LDB, IPIV,
        INFO)
        INTEGER : : N
        INTEGER : : NRHS
        COMPLEX : : L (*)
        COMPLEX : : D (*)
        COMPLEX : : SUBL (*)
        COMPLEX : : B (LDB, *)
        INTEGER : : LDB
        INTEGER : : IPIV (*)
        INTEGER : : INFO
    END SUBROUTINE
END INTERFACE
```

By parsing the comments in the source code, the interface generator can add code-generator statements to the interface file. For instance, the following example line in the F77 source code:

```
            N              (input) INTEGER
``` allows the interface generator to insert the #INPUT code-generator statement into the interface file associated with the parameter N.

Also, the following exemplary F77 source code declarations:

| | |
|---|---|
| D | (input/output) COMPLEX array, dimension (N) |
| L | (input/output) COMPLEX array, dimension (N−1) |
| SUBL | (output) COMPLEX array, dimension (N−2) |
| NRHS | (input) INTEGER | allow the interface generator to not only associate the #INOUT statement with the parameters D and L, but also the #OUTPUT statement can be associated with the SUBL parameter and the #INPUT statement to the NRHS parameter. In addition, the declaration of D gives the interface generator enough information to construct a default value for the parameter N.

Furthermore, the following exemplary F77 declaration for B:

```
        B (input/output) COMPLEX array, dimension (LDB, NRHS)
``` provides enough information to associate the #INOUT statement with B, create a default value for the LDB and NRHS parameters.

This process continues until all the comments have been examined and code-generator statements generated. The final result is an interface file populated with code-generator statements.

```
INTERFACE
    SUBROUTINE CSTSV (N, NRHS, L, D, SUBL, B, LDB, IPIV,
        INFO)
        INTEGER : : N !#INPUT, #D (#SIZE (D, #DIM=1))
        INTEGER : : NRHS !#D (#SIZE (B, #DIM=2))
        COMPLEX : : L (*) !#INOUT
        COMPLEX : : D (*) !#INOUT
        COMPLEX : : SUBL (*) !#OUTPUT
        COMPLEX : : B (LDB, *) !#INOUT
        INTEGER : : LDB !#D (#STRIDE (B, #DIM=2))
        INTEGER : : IPIV (*) !#OUTPUT
        INTEGER : : INFO !#INFO
    END SUBROUTINE
END INTERFACE
```

Figure 5A:
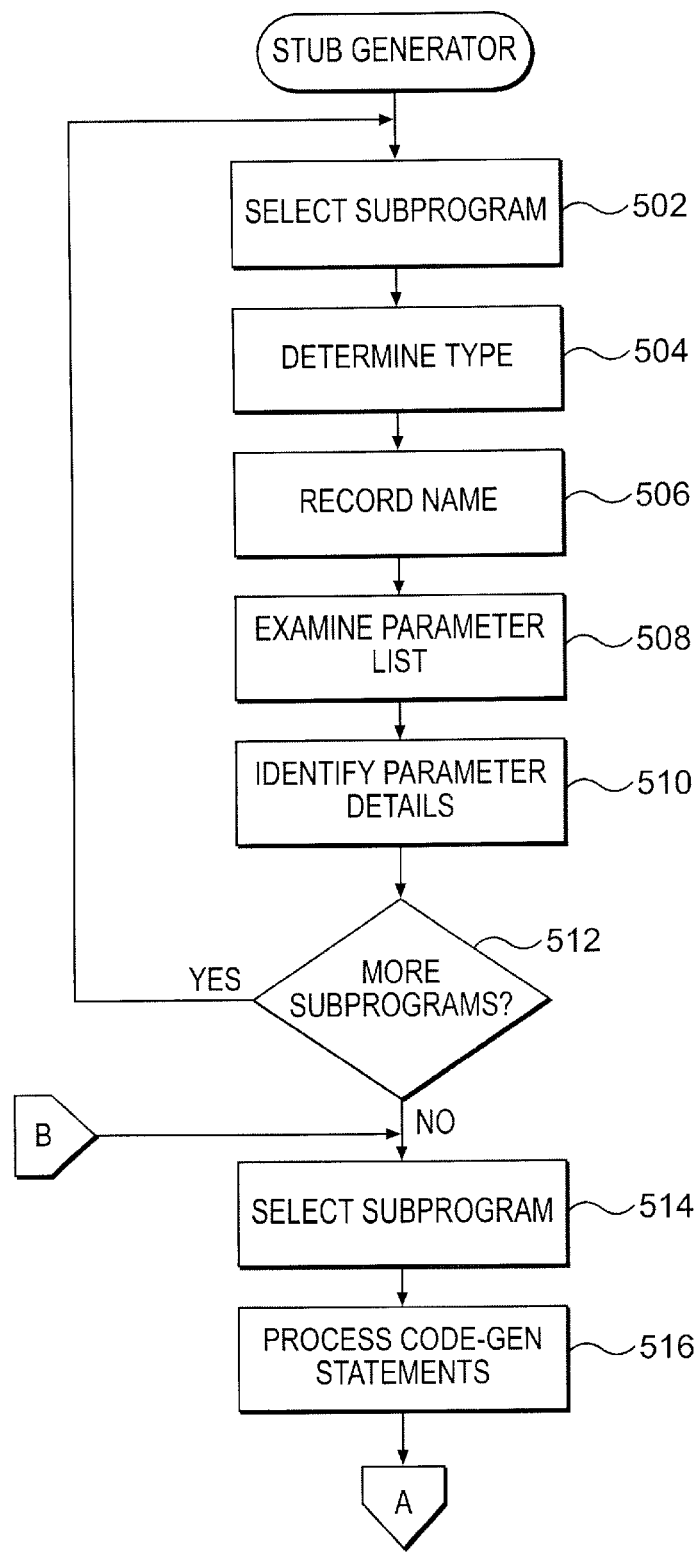
FIGS. 5A and 5B depict a flow chart of the steps performed by the stub generator depicted in FIG. 2.
Figure 5B:
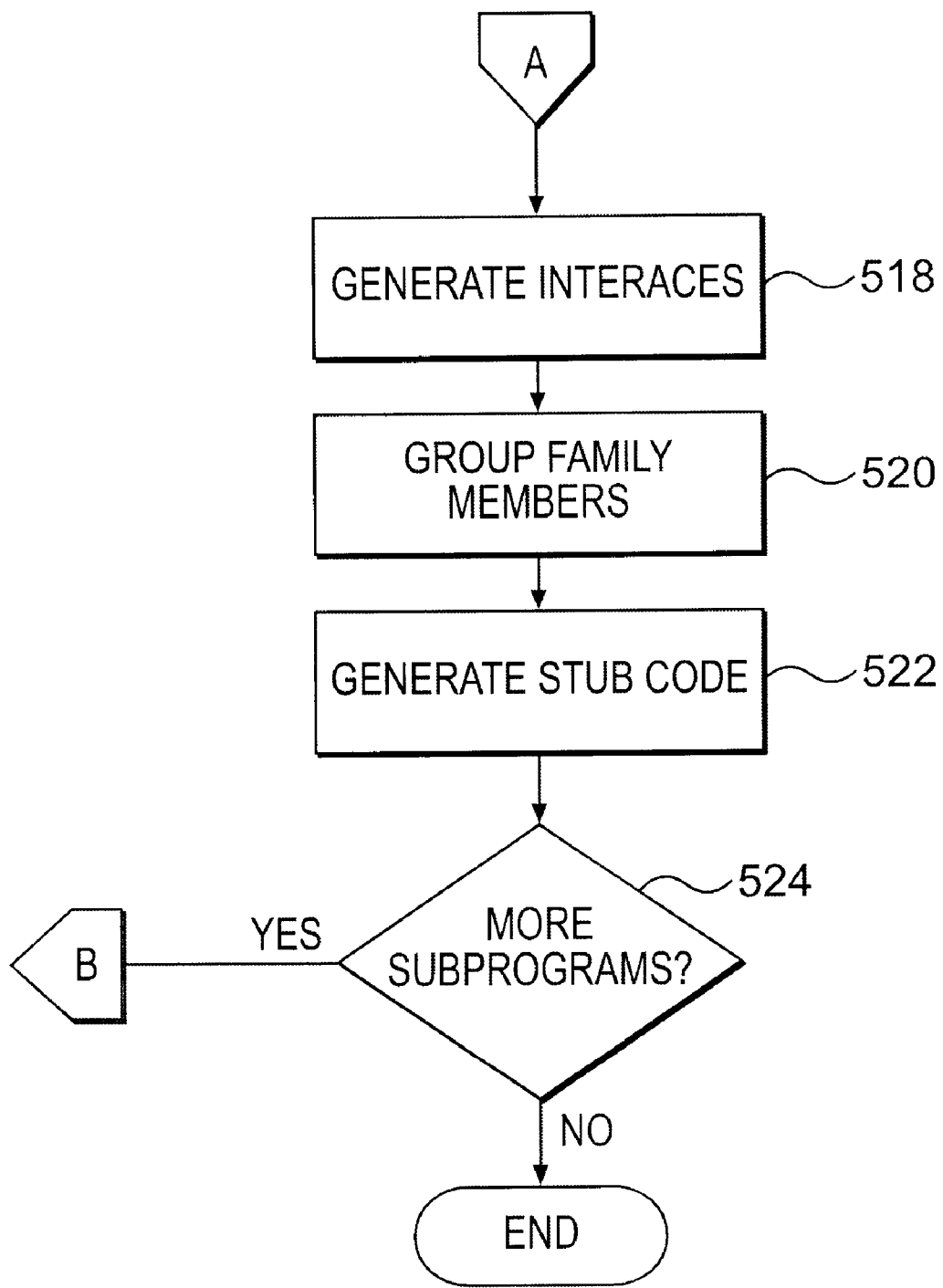

FIGS. 5A and 5B depict a flowchart of the steps performed by the stub generator. The stub generator performs two passes through the interface file that has been marked up with the code-generator statements. The first pass discovers information regarding each subprogram and its parameters and begins to populate a hash table with such information. The second pass through each subprogram provides more detailed information to the hash table. Once the hash table has been populated, the stub generator generates stubs using this information. The first step performed by the stub generator is to select a subprogram (step 502). Next, the stub generator determines whether the subprogram is a subroutine (i.e., does not return a return code) or is a function (i.e., returns a return code) (step 504). Next, the stub generator records the name of the subprogram into a hash table, one entry for each subprogram (step 506). Each hash table entry has the following items of information, where items 2–14 are specified for each parameter of the subprogram:

1) Subprogram Name
2) Parameter Name
3) Type (logical, real, double, etc.)
4) Rank (shape)
5) Optional: true/false
6) Info: true/false or expression indicating whether an error has occurred.
7) Work: expression indicating amount of memory needed for this parameter.
8) Sizer: this parameter describes the size of another parameter, the name of that parameter is stored in this field.
9) Mysizer: if another parameter is a sizer for this parameter, that parameter's name is stored in this field.
10) Not here: the source code that needs to be inserted into the stub if parameter is missing.
11) Here: source code to be inserted if the parameter exists (e.g., an info parameter causing the checking of a parameter after execution of the subprogram to see if an error code is set).
12) Strider: if this parameter is a strider for another parameter, then its name is stored in this field.

-continued

13) Mystrider: if another parameter acts as the strider for this parameter, then its name is stored in this entry.
14) Intent: undefined, input, output, or i/o.

After recording the name, the stub generator examines the parameter list to determine the number of parameters as well as their name for the subprogram and stores this information into the hash table (step 508). The stub generator then identifies the details of each parameter including its shape and type and stores this into the hash table (step 510). After identifying the parameter details, the stub generator determines if there are more subprograms, and if so, proceeds to step 502.

Otherwise, the stub generator proceeds to the second pass by selecting a subprogram (step 514). Next, the stub generator processes the code-generator statements by inserting various information into the hash table. The following table indicates the code-generator statements and the processing that occurs for each one:

| Code-Generator Statement | Processing That Occurs |
| --- | --- |
| D (default expression) | Put expression into "not here" field of hash table and set optional to true. |
| Here (expression) | Straight copy from "here" code-generator statement to "here" field in hash table. |
| | If (expression, default1, else, default2) Copy entire expression into "nothere," so at runtime the correct default is set. Set optional to true. |
| Info | If this code-generator statement doesn't appear, set this field to false. Copy expression into Info part of hash table. If there is no expression, set Info to true. |
| Inout, Input, Output | Set the intent field accordingly. |
| Range | Set to value in Rank. |
| Size | Copy this value to "sizer" entry. |
| Stride | Copy this value to "strider" entry. |
| Work | Copy of expression to the "work" entry. |

After processing the code-generator statements, the stub generator generates interfaces (step 518). In this step, the stub generator generates one interface for each legal combination of parameters given their optionality. This list is provided next to the "G" code-generator statements. Each interface contains a declaration for a given combination of parameters and follows the format described above with respect to Table 1. After generating the interfaces, the stub generator groups families of interfaces together to form a single interface (step 520). An example of a single interface follows:

```
INTERFACE ABC
    SUBROUTINE ABC1
    . . .
    END SUBROUTINE
    SUBROUTINE ABC2
    . . .
    END SUBROUTINE
    . . .
    SUBROUTINE ABCN
    END SUBROUTINE
END INTERFACE
```

Next, the stub generator generates the stub code for each interface (step 522). For an interface with a complete parameter list, the stub code simply invokes the F77 subprogram. For an interface with an incomplete parameter list, the stub code determines which parameters are missing and then inserts the appropriate information given the "not here" entry in the hash table. If the "info" entry is undefined or true, then the stub code need do nothing. If, however, "info" contains an expression, then code is inserted to check the F77 code return value and generate an error code if appropriate. If one of the parameters is a work parameter, then the stub routine allocates the appropriate memory before the F77 call and deallocates the memory afterwards. After generating the stub code, the stub code generator determines if there are more subprograms (step 524) and, if so, continues to step 502. Otherwise, processing ends.

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method performed in a data processing system, the method comprising:

generating a Fortran 77 interface file from Fortran 77 source code by invoking an interface generator, wherein the interface generator scans the Fortran 77 source code and creates an interface file for a subprogram contained in the Fortran 77 source code;

adding a code-generator statement to the interface file, wherein the code-generator statement includes a comment describing how to generate a value for a given parameter if the value for the parameter is missing;

invoking a stub generator, wherein the stub generator reads the interface file and generates a stub routine using the code-generator statement; and compiling the stub routine.

2. The method of claim 1, further including the step of:

linking the stub routine into Fortran 90 source code to enable its invocation from Fortran 90 source code.

3. A method performed in a data processing system, the method comprising:

selecting a subprogram from Fortran 77 source code;

creating an interface file for the subprogram;

generating a definition for the subprogram;

determining whether more than a maximum number of stub routines could be generated by determining each possible legal combination of parameters used by the subprogram, and when more than a maximum number of stub routines could be generated, providing an option to a user of editing the stub routines after the interface generator completes its processing; and inserting a code-generator statement for each legal combination of parameters into the interface file indicating the stub routines that should be generated.

4. The method of claim 3, further including the step of:

generating the stub routines using the code-generator statements; and linking the stub routines into Fortran 90 source code to enable their invocation from the Fortran 90 source code.

5. A computer-readable medium containing instructions for controlling a data processing system to perform a method comprising the steps of:

generating a Fortran 77 interface file from Fortran 77 source code by invoking an interface generator, wherein the interface generator scans the Fortran 77 source code and creates an interface file for a subprogram contained in the Fortran 77 source code;

adding a code-generator statement to the interface file, wherein the code-generator statement includes a comment describing how to generate a value for a given parameter if the value for the parameter is missing;

invoking a stub generator, wherein the stub generator reads the interface file and generates a stub routine using the code-generator statement; and compiling the stub routine.

6. The computer-readable medium of claim 5, further comprising the step of:

linking the stub routine into Fortran 90 source code to enable its invocation from Fortran 90 source code.

7. A computer-readable medium containing instructions for controlling a data processing system to perform a method comprising the steps of:

selecting a subprogram from Fortran 77 source code;

creating an interface file for the subprogram;

generating a definition for the subprogram;

determining whether more than a maximum number of stub routines could be generated by determining each possible legal combination of parameters used by the subprogram and when more than a maximum number of stub routines could be generated, providing an option to a user of editing the stub routines after the interface generator completes its processing; and inserting a code-generator statement for each legal combination of parameters into the interface file indicating the stub routines that should be generated.

8. The computer-readable medium of claim 7, further comprising the steps of:

generating the stub routines using the code-generator statements; and linking the stub routines into Fortran 90 source code to enable their invocation from the Fortran 90 source code.

* * * * *